United States Patent [19]

Hujik

[11] 3,732,055
[45] May 8, 1973

[54] APPARATUS FOR AUTOMATICALLY PRODUCING A MOLDED SOLE

[75] Inventor: Ladislav Hujik, Batawa, Ontar Canada

[73] Assignee: Bata Shoe Company, Inc., Belcamp, Md.

[22] Filed: Oct. 30, 1970

[21] Appl. No.: 85,481

[30] Foreign Application Priority Data

Oct. 31, 1969 Canada..................66,367

[52] U.S. Cl............425/308, 425/DIG. 51, 425/441, 425/444, 425/149
[51] Int. Cl..................................B29f 1/14
[58] Field of Search.................425/164, 165, 236, 425/242, 249, 351, 422, 444, DIG. 806, 289, 139, 441, DIG. 51, 308; 18/DIG. 51

[56] References Cited

UNITED STATES PATENTS 3,588,958  6/1971  Metzger..................425/119
3,231,933  2/1968  Benedetto..................425/249
3,584,345  6/1971  Beastrom..................425/129

FOREIGN PATENTS OR APPLICATIONS

1,275,276  8/1968  Germany..................18/DIG. 51

*Primary Examiner*—J. Spencer Overholser
*Assistant Examiner*—David S. Safran
*Attorney*—Holman and Stern

[57] ABSTRACT

The automatic manufacture of a molded sole in which means are provided for automatically removing the sprues of material normally remaining attached to a sole after the molding thereof with the sprues being removed during movement of the molds between a molding position and a discharge position. Subsequently and during the return movement of the molds from the discharge position to the molding position, the molded soles are wiped from the molds, whereby upon return of the molds to the molding position, the apparatus is ready for a further molding cycle.

2 Claims, 8 Drawing Figures

APPARATUS FOR AUTOMATICALLY PRODUCING A MOLDED SOLE

BACKGROUND OF THE INVENTION

This invention relates to an automatic sole molding apparatus and to a method of manufacturing a sole.

In further the invention relates to the provision in such an apparatus of means for Automatically removing the sprue of material remaining attached to the sole after molding thereof, with the sprue being removed during movement of the mold from a molding station to a discharge station, and with means for automatically wiping the mold sole, from which the sprue has been removed, from the mold during return movement of the mold to the molding station in readiness for the next molding cycle.

SUMMARY OF THE INVENTION

In one embodiment of the invention, the sprue removal means comprises a pair of normally open gripper members disposed out of the path of travel of the mold between the molding and discharge stations. The sprue removal means is adapted to be swung from its rest position out of the path of travel of the mold to a position rearwardly of the mold upon movement of the latter away from the mold station and the gripper members are adapted to be moved relative to one another to grip the trailing end of the sprue and to remove such sprue during the further movement of the mold towards the discharge station. Upon removal of the sprue from the mold, the gripper members are adapted to be returned to their normally open position thereby releasing the sprue and during return movement of the mold, the sprue removal means is returned to its rest position out of the path of travel of the mold. Also upon removal of the sprue, suitable means, which may be pins mounted in the mold, are actuated to separate the molded sole from the mold to a position in which the sole is clear of the protrusions on the heel part of the mold. During the return movement of the mold to the molding station, the molded sole is wiped off the mold by suitable stationary means mounted in the path of travel of the mold and which are adapted to engage the heel part of the molded sole when the latter is in its elevated position with respect to the mold. Upon return of the mold to the molding station, the apparatus is then ready for the repeat cycle.

An object of the invention is to provide a simple, inexpensive automatic sole molding apparatus provided with means for automatically removing the sprue normally remaining attached to the molded sole after the molding operation has been completed.

A further object of the invention is to provide a compact, flexible sole molding apparatus in which the sole is molded, the mold sections separated, the sprue of material remaining attached to the molded sole automatically removed during movement of the mold section carrying the molded sole from the molding station to a discharge station and the molded sole automatically wiped from the mold section during the return movement thereof to the molding station.

The invention also has for its object the provision of a simple sprue gripping mechanism normally biased to a position out of the path of travel of the mold and having a pair of normally open gripper members, the sprue gripping mechanism being adapted to be swung into a position behind the mold upon movement of the latter away from the molding station and provided with means for moving the gripping members into their closed position, at which they grip the trailing end of the sprue, at a predetermined point in the travel of said mold away from the molding station, and during subsequent movement of said mold remove the sprue from the mold and then release the separated sprue.

In accordance with the foregoing and other objects the present invention contemplates the provision of an apparatus in which the mold is formed of two sections adapted to be moved into sealing engagement prior to injection of a thermoplastic material into a mold cavity defined therebetween and subsequently separate to facilitate removal of the molded sole, the mold sections being movable in mutually perpendicular directions, characterized in that means are provided for removing a sprue of the material remaining attached to the sole subsequent to the molding operation and after separation of the mold sections, the sprue removal means being movable to a position behind the mold and operable to grip the sprue at an intermediate point in the path of travel of that one of the mold sections carrying the molded sole and remove the sprue during the subsequent further movement of the one mold section in the same direction and be rendered inoperative and moved out of the path of travel of the one mold section prior to the return movement thereof in the opposite direction.

The apparatus preferably includes means for moving the molded sole out of contact with the one mold section after separation of the two mold sections and stationary means mounted over the path of travel of the one mold section being adapted to engage the heel section of the molded sole upon movement of the one mold section to its furthermost extent in the one direction to wipe the molded sole from the one mold section during return movement of the latter in the operative direction.

The means for moving the molded sole out of contact with the mold section are preferably pneumatically operated but may also be operated in any other suitable manner such as, for example, hydraulically, electrically or through a mechanical linkage. The sprue gripping means may conveniently comprise a pair of normally open gripper members which, with the mold section in the molding position, are disposed out of the path of travel thereof but which are movable by, for example, a cam and cam follower arrangement mounted on the mold section and the sprue gripping mechanism respectively, behind and into the path of travel of the mold section upon movement thereof away from the molding station and pneumatically, or otherwise, operated means being adapted to move the gripping members to their closed position about the trailing end of the sprue during subsequent further movement of the mold section away from the molding station.

The invention also contemplates a method of manufacturing a molded sole which comprises injecting a thermoplastic material into a cavity formed within two mold sections disposed at a molding station in sealing engagement with one another to define thereby a molded sole; separating the mold sections while causing the molded sole to remain in one of the mold sections; moving the one mold section in a first direction away from the molding station; moving a sprue removal means into a position to the rear of the one mold section during movement of the latter in the first direction; actuating the sprue gripping means to grip a sprue of material trailing from the molded sole and removing the sprue from the sole and the mold during the subsequent movement of the one mold section in the first direction; displacing the sole from direct contact with the one mold section; wiping the displaced sole off the one mold section during return movement of the latter, in a direction opposite to the one direction, to the molding station; and moving the sprue gripping means out of the path of travel of the one mold section upon return movement of the latter to the molding station in readiness for manufacture of a further sole.

Other features of the invention will be described hereinafter and referred to in the appended claims.

The invention will now be more particularly described with reference to the accompanying drawings which show, by way of example, one embodiment of the invention and in which:

DETAILED DESCRIPTION OF THE INVENTION

Referring to the drawings, it will be seen that the apparatus includes a carriage 2 mounted for longitudinal movement along tracks generally designated 4, with movement of the carriage being effected by means of a pneumatic cylinder 6 mounted on a machine bed 7 and having the free end of its piston rod 8 connected to the carriage. Actuation of the cylinder 6 serves to reciprocate the carriage along the tracks 4. The carriage mounts the lower section of each of a pair of molds. Each of the molds comprises upper and lower mold sections 12 and 14 respectively, the lower mold section 14 being mounted on the carriage 2 and movable relative to the upper mold section 12. With the carriage positioned with the upper and lower sections of each mold in alignment with one another, a tight sealing engagement is obtained and each pair of mold sections defines therebetween a molding cavity 16. Each of the lower mold sections 14 is clamped to the carriage 2 by suitable retaining screws 18 and a cooling plate 20, provided with transversely extending passages 22 through which a cooling fluid may be circulated, is interposed between each of the lower mold sections and the carriage. The upper mold sections 12 are each clamped by means of screws 24 to vertically reciprocal pistons 26 of pneumatic cylinders 28 which are mounted in any suitable manner above the tracks 4 on a frame generally designated 29. A cooling plate 30 is interposed between each of the upper mold sections 12 and its associated piston 26. The cooling plates 30 are provided with transversely extending passages 31 through which a cooling fluid may be circulated.

Each of the lower mold sections 14 is provided with passages designated 32 having branch passages 34, 36 and 38 opening into the upper face of the lower mold section. Pins 35, 37 and 39 are positioned in the branch passages 34, 36 and 38 respectively. The upper ends of the pins 35, 37 and 39 normally lie flush with the upper surface of the lower mold section and are adapted to be ejected through the branch passages 34, 36 and 38 under the action of compressed air introduced into the passage 32. Each of the upper mold sections 12 is provided with a longitudinally extending passage 40 communicating with a number of vertically extending passages 42 which open onto the lower face of the upper mold section 12. Compressed air introduced into the passage 40 is adapted to flow through the passages 42 into the tops of the mold cavities and serves to blow molded soles out of the top mold sections.

Figure 2:
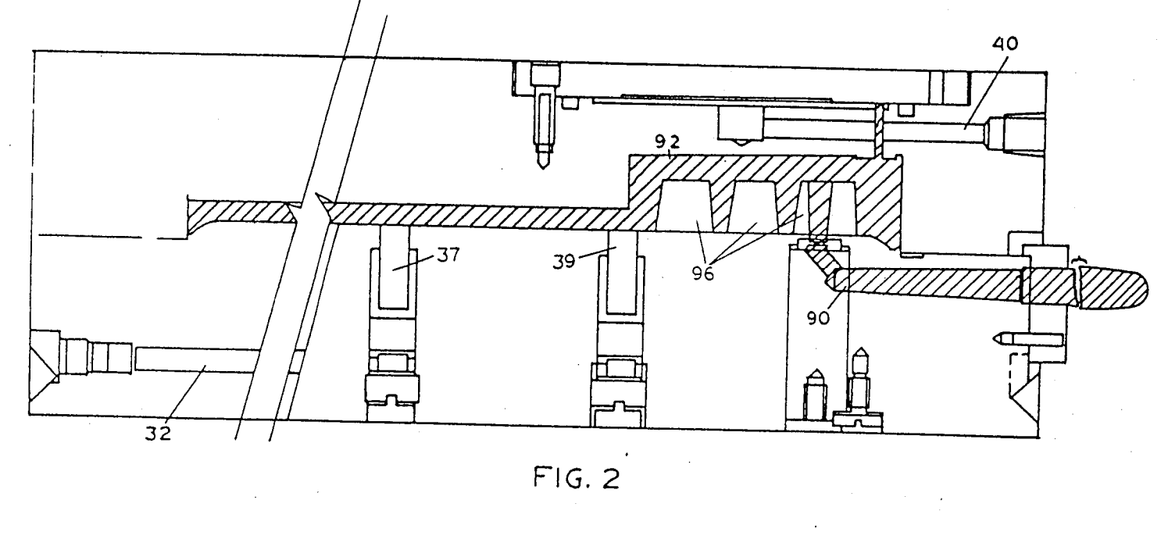
FIG. 2 is a view partly in side elevation and partly in section showing the mold with a sole in the cavity and also showing the injection passages.

Each of the molds is provided with an extruder 43 for plastic material having a barrel cap 44 which communicates through a nozzle 45 with the inlet end of a longitudinally extending passage 46 in the lower mold section 14 with the outlet end of the passage opening into the mold cavity defined between the upper and lower mold sections 12 and 14 respectively.

A normally open injection cut-off microswitch 48 is mounted on a side member 31 of the frame 29 and an injection terminating setting screw 49 is mounted on the upper face of the piston 26 in a position in which it engages and actuates the microswitch 48 when the pistons 26 are extended and the top mold sections 12 are moved into sealing engagement with the lower mold sections 14. A wiper plate 94 with an associated stop member 52 is mounted over the tracks 4 adjacent the front of the apparatus in the direction of forward travel of the carriage 2.

Figure 7:
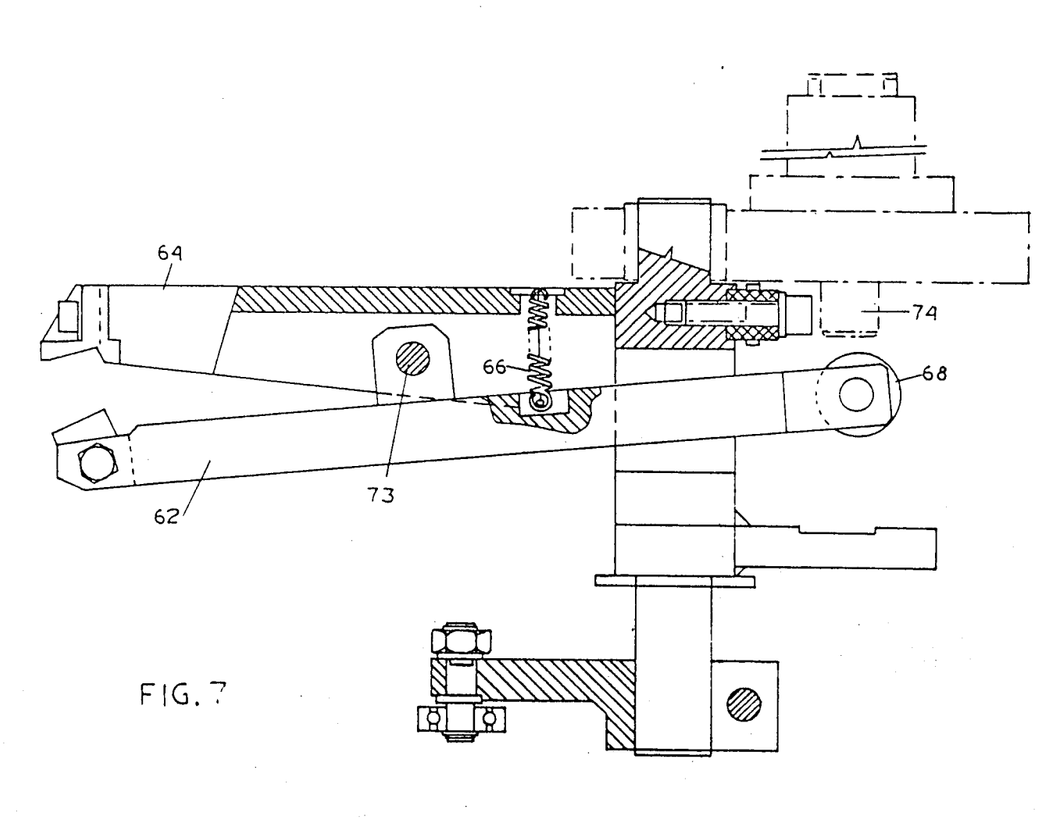
FIG. 7 is a view partly in side elevation and partly in section showing details of a sprue gripping mechanism shown in its open condition.

With the carriage 2 positioned beneath the cylinders 28, sprue gripping mechanisms 60 are moved about their pivots 76 to a position in which they extend parallel to and out of the path of travel of the carriage 2. Each of the sprue gripping mechanisms 60 comprises a pair of pivotally connected gripper members 62 and 64 having oppositely disposed jaws at one of their ends and a spring 66 connected at its opposite ends to the gripper members 62 and 64 respectively, with the spring resiliently biasing the two gripper members 62 and 64 away from each other. A roller 68 is rotatably mounted on the end of the lower gripper member 62 remote from its jaw and plate 70 mounted on the pivot 76 carries a pneumatic cylinder 72 with piston 74 thereof, when extended, being adapted to engage the roller 68 and urge the lower gripper member 62 upwardly causing it to rotate about its pivot 73 to move the jaws towards each other against the bias of the spring 66.

Figure 5:
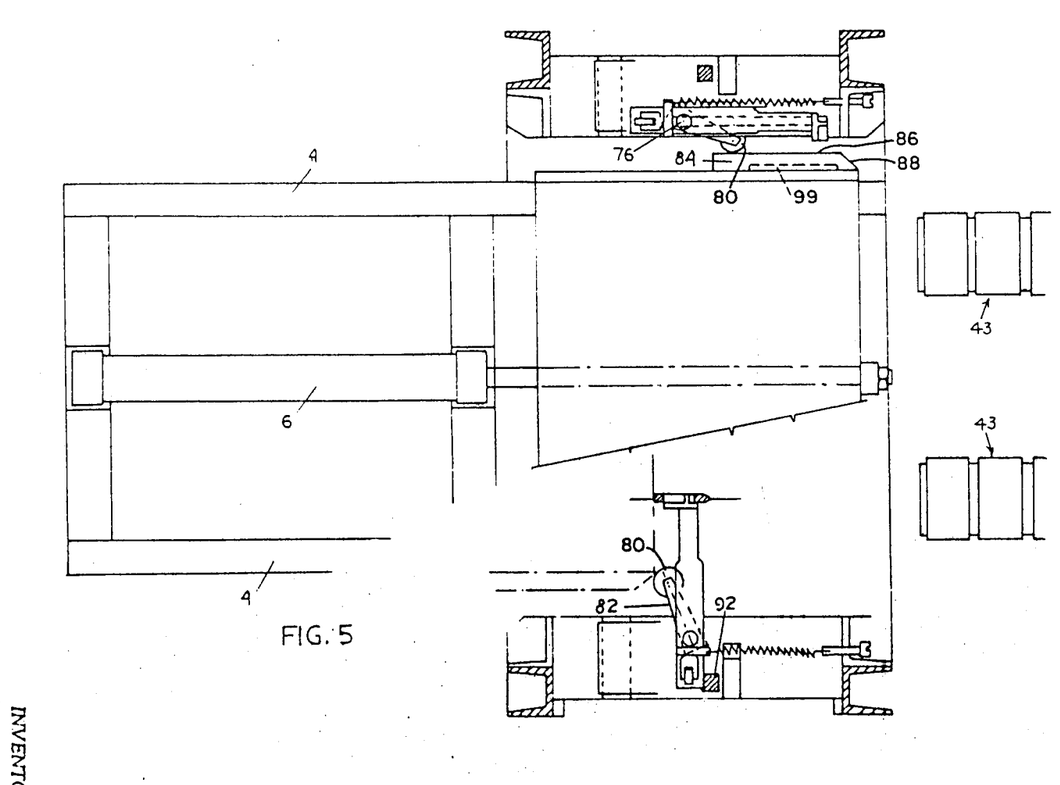
FIG. 5 is a top plan view partly broken away and showing the mold carriage and the sprue gripper mechanism, with the upper sprue gripper mechanism shown in its normally retracted position and the lower sprue gripper mechanism shown in its extended operative position.
Figure 8:
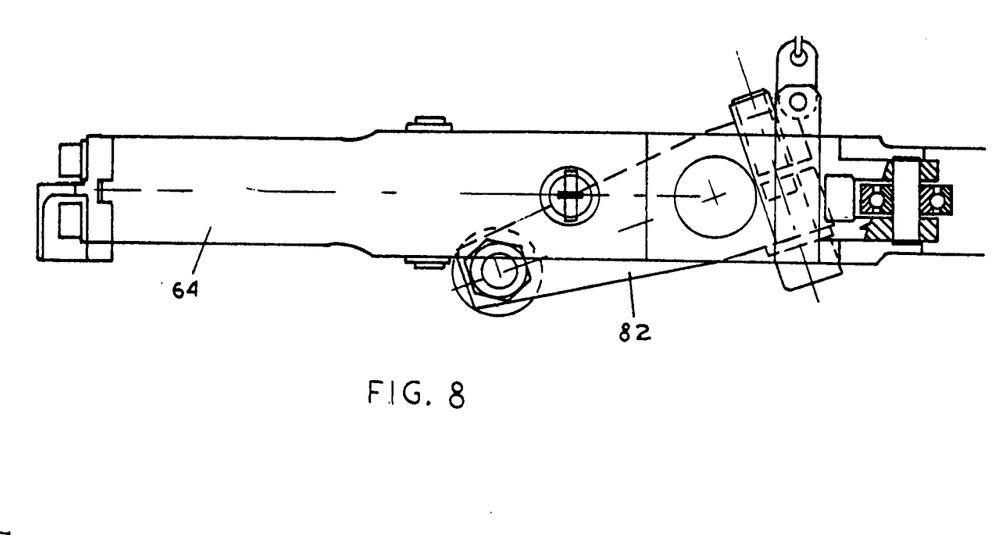
FIG. 8 is a top plan view of the sprue gripping mechanism shown in its extended operative position.

As best seen in FIGS. 5 and 8, cam followers 80 are mounted on the end of arms 82 which are secured to each of the upper gripper members 64. The cam follower 80 engages a cam 84 mounted on either side of the carriage 2. With the carriage in the molding position i.e., at a position within the frame and beneath the cylinders 28, the cam follower 80 rides on surface 86 of the cam 84 which surface extends parallel to the longitudinal axis of the carriage. In this position, as shown in the upper part of FIG. 5, the sprue gripping mechanism is swung about its pivot 76 to a position in which it is out of the path of travel of the carriage. Upon movement of the carriage 2 in a direction away from the molding position, the cam 80 travels over the surface 86 and at a predetermined point in the carriage traverse, the cam follower moves onto bevelled surface 88 of the cam 84 into a position in which the sprue gripping mechanism is swung about its pivot to a position whereby the gripper members 62 and 64 extend at 90° to the path of travel of the carriage 2 as shown in the lower part of FIG. 5. Movement of the gripper members 62 and 64 beyond the 90° extended position is prevented by suitable stop members 92 mounted on the machine.

Each of the sprue gripping mechanisms 60, when moved to its extended position upon forward travel of the carriage 2 away from the molding position, is adapted to grip a sprue 90 of molding material which remains connected to the molded sole 92 after formation of the latter and thereafter, upon subsequent further movement of the carriage 2 in the same direction, the sprue gripping mechanism is operable to disconnect the sprue 90 and to remove it from the lower mold sections 14. In order to close the gripper members 62 and 64, a pneumatic limit valve 97 is provided on one of the tracks 4 forwardly of the center of the carriage 2 when the latter is in the molding position. The valve 97 includes an upwardly extending lever or arm 98 for engagement by a cam in the form of a plate 99 mounted on one side of the carriage 2 adjacent the rear end thereof. During movement of the carriage 2 away from the molding position, i.e., after the gripper members 62 and 64 have swung into position behind the lower mold section 14, the plate 99 pivots the lever 98 to open the valve 97, which controls the flow of compressed air to the cylinder 72. The gripper members 62 and 64 merely grip the sprue and, as a result of continued movement of the carriage 2, the sprue is pulled from the lower mold section 14. Upon continued movement of carriage 2, the lever 98 is released by the plate 99 to close the valve 97, whereby the supply of air to the cylinder 72 ceases, and the gripper members 62 and 64 open to release the sprue, which drops between the tracks 4.

The upper face of the molded soles 92 which are carried by the lower sections 14 are adapted to pass under and clear a lower edge 93 of the wiper plates 94 (FIG. 1) during movement of the carriage 2 towards its extreme position remote from the molding position. Once the molded soles 92 have completely passed the wiper plates 94, compressed air is introduced into the passage 32 thereby raising the pins 35, 37 and 39 to lift the soles 92 clear of protrusions 96 formed on the upper surface of the lower mold sections. Upon reversing the carriage 2 to the molding position, heel portions 95 of the molded soles which are raised by the pins 35, 37 and 39 are engaged by the wiper plates 94 and subsequent movement of the carriage 2 towards the molding position is effective to wipe the molded soles 92 off the lower sections 14, with the molded soles falling between the tracks into a bin, onto a conveyor or to any other suitable means for directing the soles to a desired disposal or storage location.

Once the molded soles 92 have been wiped off the lower mold sections 14, the air supply to the passage 32 is cut-off and the pins 35, 37 and 39 return to their normal position in which they do not project above the upper surface of the lower sections 14.

A typical cycle of operation of the apparatus is as follows:

The carriage 2 with its associated lower mold sections 14 is moved by the cylinder 6 to the molding position and the cylinders 28 are then actuated to move their associated pistons 26 and the upper mold sections 12 into sealing engagement with the lower sections 14. In this position, the setting screw 49 engages the microswitch 48 to make the normally open microswitch contacts thereby energizing a circuit which includes an electric motor (not shown) driving the plastic material extruders. The extruders then inject the plastic material into the mold cavities 16 via nozzle 44 and the communicating passages 45 and 46. When the mold cavities 16 have been completely filled and with the extruder still injecting plastic material, pressure is created in the mold cavities thereby causing the top mold sections to rise. The settling screw 49 is adjusted so that a slight upward movement of the top mold sections 12 disengage the setting screw 49 from the microswitch 48 which later then returns to its normally open condition thereby breaking the circuit to the extruder motor and terminating injection of the plastic material.

A timer (now shown) cycles the apparatus to provide a cooling dwell time at this stage, with the duration of the dwell depending on the size and thickness of the molded sole and the efficiency of the forced mold cooling effected by the cooling fluid circulated through the cooling plates 20 and 30.

Thereafter, the pistons 26 are actuated to retract the upper mold sections 12 to their uppermost position. During this upward movement of the upper mold sections 12, compressed air is introduced into the top of the mold cavities 16 thereby pushing the molded soles 92 out of the upper mold sections 12 and ensuring that they remain in the lower mold sections 14.

The carriage 2 with the lower mold sections 14 thereon is then moved by the cylinder 6 away from the molding position. At a point in the forward travel of the carriage 2 approximately midway between its extreme positions, the sprue gripping mechanisms 60 are moved by their associated cams 84 and cam followers 80 to a position behind the lower mold sections 14, the lever 98 is tripped by the plate 99 to open the valve 97 and compressed air flows into the cylinder 72, so that the gripper members 62 and 64 grip the sprues 90 trailing from the two molded soles 92. Upon subsequent further forward movement of the carriage 2, the sprues 90 are disconnected from the molded soles 92 and removed from the lower mold sections 14 with the sprue gripping mechanisms 60 thereafter releasing the sprues 90 which drop between the tracks 4 and are discharged from the apparatus.

After the sprues 90 have been removed and during the final stages of the forward movement of the carriage 2, the pins 35, 37 and 39 are ejected upon introduction of compressed air into the associated passages 32 thereby raising the molded soles 92 to a position in which, during the subsequent return movement of the carriage 2, the heel portions of the molded soles 92 are engaged by the wiper plates 94 and wiped off the lower mold sections 14.

The carriage 2 then returns to the molding position moving the sprue gripping mechanisms 60 to their retracted position in longitudinal alignment with the tracks 4 out of the path of travel of the carriage 2 and the apparatus is then ready for a repeat cycle of operation.

Although in the foregoing description reference has been made to pneumatic operation of the ejection pins 35, 37 and 39 and other parts of the mechanism it will be appreciated that those elements could equally well be actuated by hydraulic, electrical or mechanical means or by any combination of such means.

I claim:

1. An automatic sole molding apparatus comprising two mold sections; means for moving said mold sections into sealing engagement for forming a mold cavity prior to injection of a thermoplastic material into the mold cavity, and for moving said mold sections apart to permit removal of a molded sole; means for moving said mold sections in mutually perpendicular directions; gripper means for gripping and removing a sprue of said thermoplastic material which remains attached to the sole subsequent to a molding operation and after said mold sections have been moved apart; cam means for moving said gripper means to a position behind the mold for gripping the sprue at an intermediate point in the path of travel of one of said mold sections carrying the molded sole, and for moving said gripper means out of said path of travel after removal of the sprue; and valve means for closing said gripper means on a sprue for removing the sprue during subsequent further travel of said one mold section in the same direction.

2. The apparatus as claimed in claim 1 including means for moving the molded sole out of contact with said mold section after separation of said two mold sections, and stationary means mounted over the path of travel of said mold section for engaging the heel section of said molded sole upon movement of said mold section to its furthermost extent in said one direction to wipe said molded sole from said mold section during return movement of the latter in the opposite direction.

* * * * *

UNITED STATES PATENT OFFICE
CERTIFICATE OF CORRECTION

Patent No. 3,732,055          Dated May 8, 1973

Inventor(s) Ladislav Hujik

It is certified that error appears in the above-identified patent and that said Letters Patent are hereby corrected as shown below:

Cancel columns 1, 2, 3 and 4, headed by Patent Number 3,733,055 and insert columns 1, 2, 3 and 4, headed by Patent Number 3,732,055.

Signed and sealed this 25th day of December 1973.

(SEAL)
Attest:

EDWARD M. FLETCHER, JR.
Attesting Officer

RENE D. TEGTMEYER
Acting Commissioner of Patents

FORM PO-1050 (10-69)

APPARATUS FOR AUTOMATICALLY PRODUCING A MOLDED SOLE

BACKGROUND OF THE INVENTION

This invention relates to an automatic sole molding apparatus and to a method of manufacturing a sole.

In further the invention relates to the provision in such an apparatus of means for Automatically removing the sprue of material remaining attached to the sole after molding thereof, with the sprue being removed during movement of the mold from a molding station to a discharge station, and with means for automatically wiping the mold sole, from which the sprue has been removed, from the mold during return movement of the mold to the molding station in readiness for the next molding cycle.

SUMMARY OF THE INVENTION

In one embodiment of the invention, the sprue removal means comprises a pair of normally open gripper members disposed out of the path of travel of the mold between the molding and discharge stations. The sprue removal means is adapted to be swung from its rest position out of the path of travel of the mold to a position rearwardly of the mold upon movement of the latter away from the mold station and the gripper members are adapted to be moved relative to one another to grip the trailing end of the sprue and to remove such sprue during the further movement of the mold towards the discharge station. Upon removal of the sprue from the mold, the gripper members are adapted to be returned to their normally open position thereby releasing the sprue and during return movement of the mold, the sprue removal means is returned to its rest position out of the path of travel of the mold. Also upon removal of the sprue, suitable means, which may be pins mounted in the mold, are actuated to separate the molded sole from the mold to a position in which the sole is clear of the protrusions on the heel part of the mold. During the return movement of the mold to the molding station, the molded sole is wiped off the mold by suitable stationary means mounted in the path of travel of the mold and which are adapted to engage the heel part of the molded sole when the latter is in its elevated position with respect to the mold. Upon return of the mold to the molding station, the apparatus is then ready for the repeat cycle.

An object of the invention is to provide a simple, inexpensive automatic sole molding apparatus provided with means for automatically removing the sprue normally remaining attached to the molded sole after the molding operation has been completed.

A further object of the invention is to provide a compact, flexible sole molding apparatus in which the sole is molded, the mold sections separated, the sprue of material remaining attached to the molded sole automatically removed during movement of the mold section carrying the molded sole from the molding station to a discharge station and the molded sole automatically wiped from the mold section during the return movement thereof to the molding station.

The invention also has for its object the provision of a simple sprue gripping mechanism normally biased to a position out of the path of travel of the mold and having a pair of normally open gripper members, the sprue gripping mechanism being adapted to be swung into a position behind the mold upon movement of the latter away from the molding station and provided with means for moving the gripping members into their closed position, at which they grip the trailing end of the sprue, at a predetermined point in the travel of said mold away from the molding station, and during subsequent movement of said mold remove the sprue from the mold and then release the separated sprue.

In accordance with the foregoing and other objects the present invention contemplates the provision of an apparatus in which the mold is formed of two sections adapted to be moved into sealing engagement prior to injection of a thermoplastic material into a mold cavity defined therebetween and subsequently separate to facilitate removal of the molded sole, the mold sections being movable in mutually perpendicular directions, characterized in that means are provided for removing a sprue of the material remaining attached to the sole subsequent to the molding operation and after separation of the mold sections, the sprue removal means being movable to a position behind the mold and operable to grip the sprue at an intermediate point in the path of travel of that one of the mold sections carrying the molded sole and remove the sprue during the subsequent further movement of the one mold section in the same direction and be rendered inoperative and moved out of the path of travel of the one mold section prior to the return movement thereof in the opposite direction.

The apparatus preferably includes means for moving the molded sole out of contact with the one mold section after separation of the two mold sections and stationary means mounted over the path of travel of the one mold section being adapted to engage the heel section of the molded sole upon movement of the one mold section to its furthermost extent in the one direction to wipe the molded sole from the one mold section during return movement of the latter in the operative direction.

The means for moving the molded sole out of contact with the mold section are preferably pneumatically operated but may also be operated in any other suitable manner such as, for example, hydraulically, electrically or through a mechanical linkage. The sprue gripping means may conveniently comprise a pair of normally open gripper members which, with the mold section in the molding position, are disposed out of the path of travel thereof but which are movable by, for example, a cam and cam follower arrangement mounted on the mold section and the sprue gripping mechanism respectively, behind and into the path of travel of the mold section upon movement thereof away from the molding station and pneumatically, or otherwise, operated means being adapted to move the gripping members to their closed position about the trailing end of the sprue during subsequent further movement of the mold section away from the molding station.

The invention also contemplates a method of manufacturing a molded sole which comprises injecting a thermoplastic material into a cavity formed within two mold sections disposed at a molding station in sealing engagement with one another to define thereby a molded sole; separating the mold sections while causing the molded sole to remain in one of the mold sections; moving the one mold section in a first direction away from the molding station; moving a sprue removal means into a position to the rear of the one mold section during movement of the latter in the first direction; actuating the sprue gripping means to grip a sprue of material trailing from the molded sole and removing the sprue from the sole and the mold during the subsequent movement of the one mold section in the first direction; displacing the sole from direct contact with the one mold section; wiping the displaced sole off the one mold section during return movement of the latter, in a direction opposite to the one direction, to the molding station; and moving the sprue gripping means out of the path of travel of the one mold section upon return movement of the latter to the molding station in readiness for manufacture of a further sole.

Other features of the invention will be described hereinafter and referred to in the appended claims.

The invention will now be more particularly described with reference to the accompanying drawings which show, by way of example, one embodiment of the invention and in which:

BRIEF DESCRIPTION OF THE DRAWINGS

Figure 1:
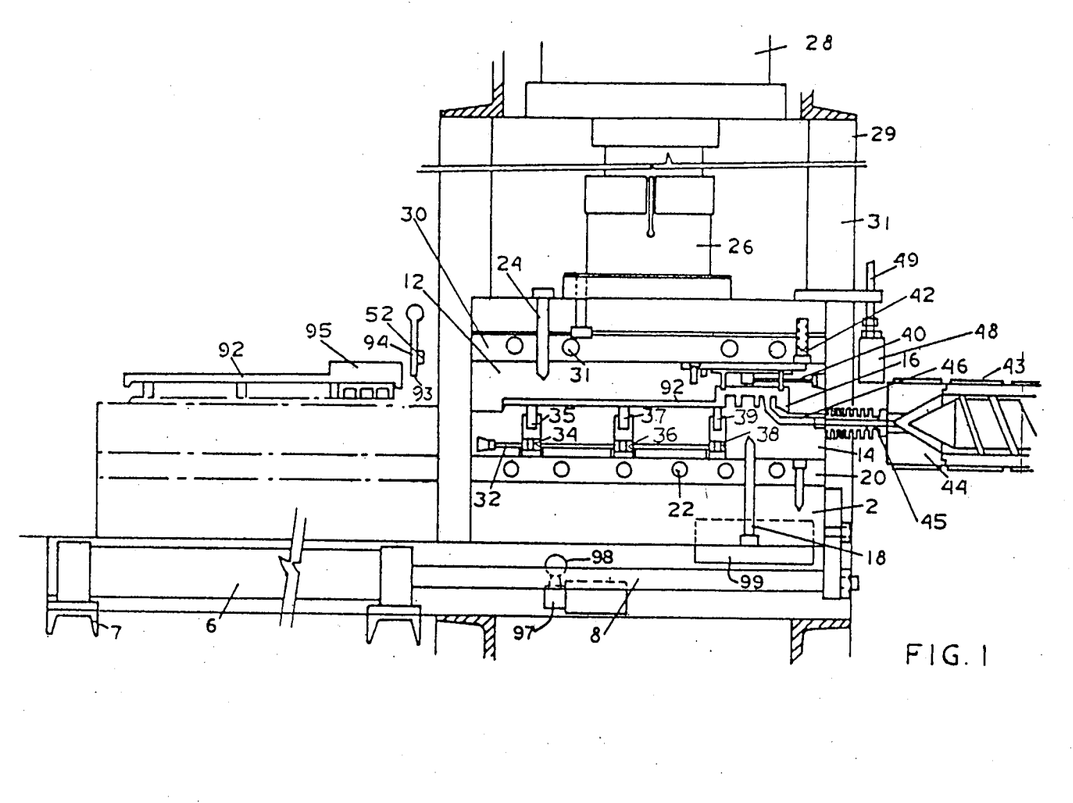
FIG. 1 is a view, partly in side elevation and partly in section, showing the general arrangement of one embodiment of the apparatus.
Figure 3:
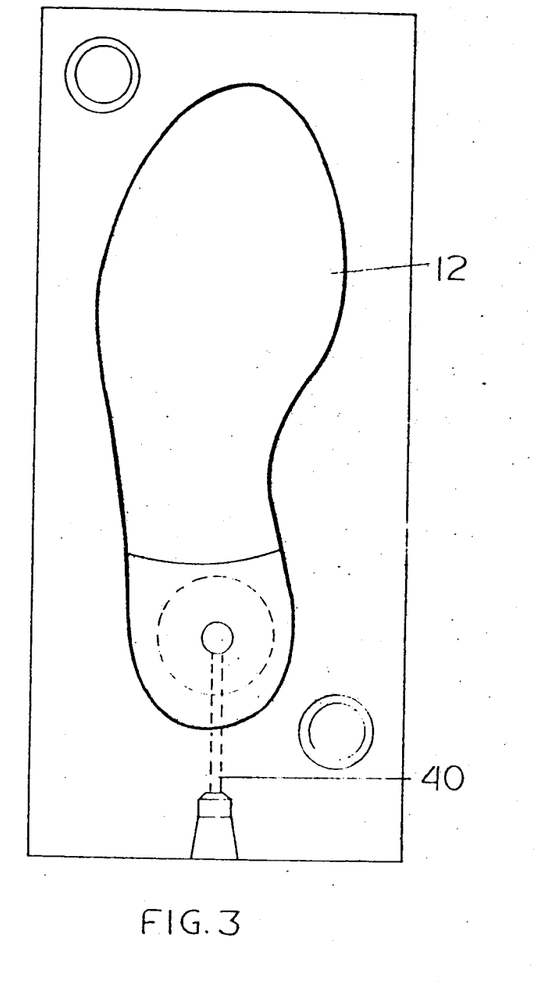
FIG. 3 is a plan view of the top section of the mold.
Figure 4:
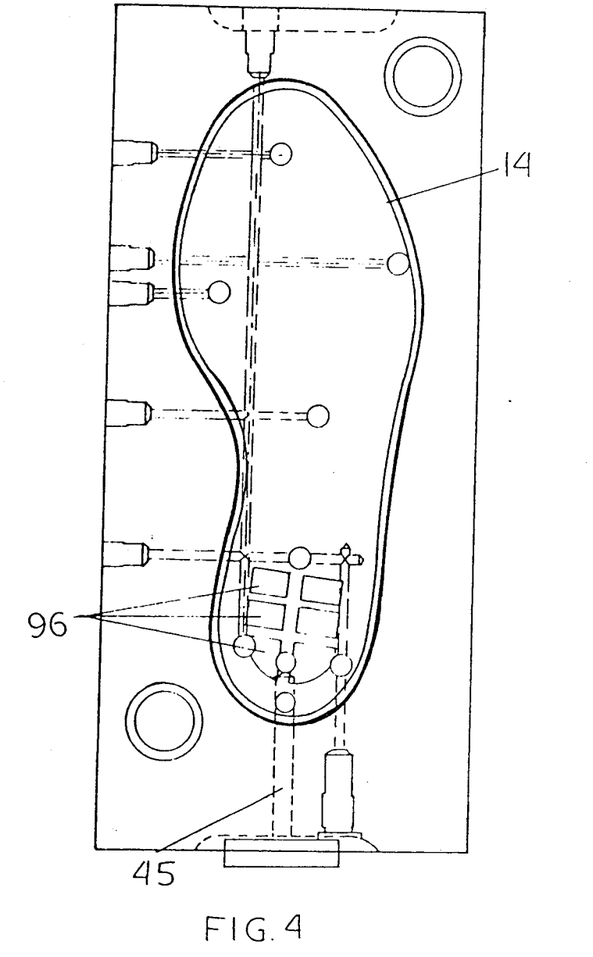
FIG. 4 is a plan view of the bottom section of the mold.
Figure 6:
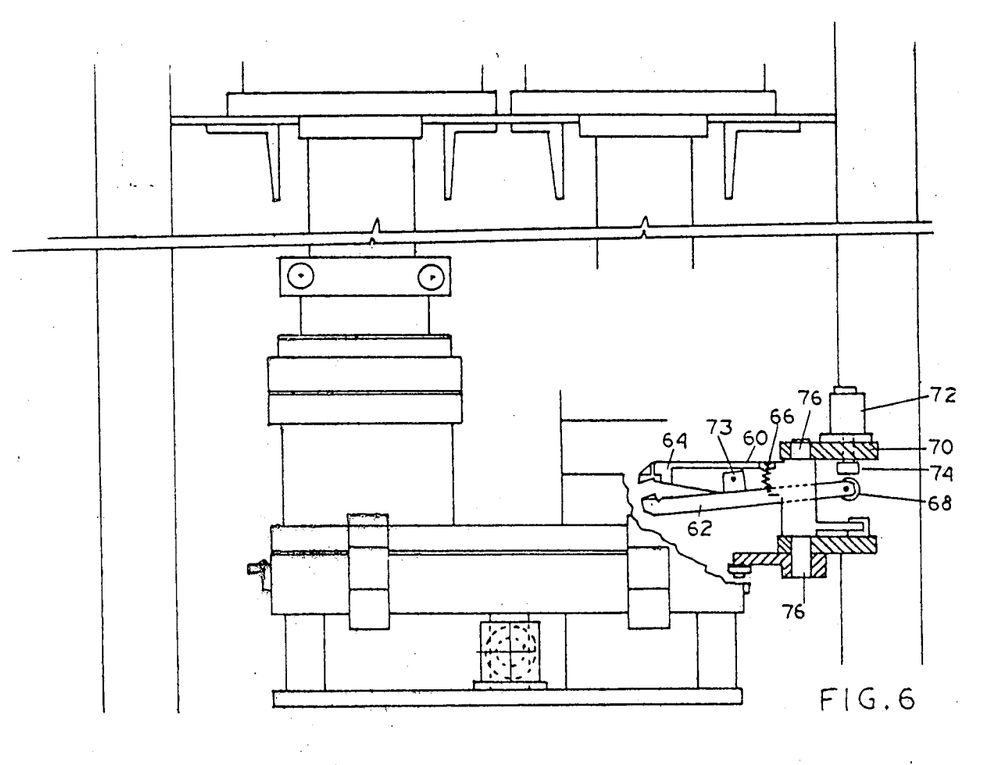
FIG. 6 is an end elevation view, partly broken away to show one of the sprue gripper mechanisms in its extended operative position and showing the disposition of the pneumatic cylinders controlling the upper mold section and the disposition of the lower mold section, the carriage and supporting frames.

FIG. 1 is a view, partly in side elevation and partly in section, showing the general arrangement of one embodiment of the apparatus, FIG. 2 is a view partly in side elevation and partly in section showing the mold with a sole in the cavity and also showing the injection passages, FIG. 3 is a plan view of the top section of the mold, FIG. 4 is a plan view of the bottom section of the mold, FIG. 5 is a top plan view partly broken away and showing the mold carriage and the sprue gripper mechanism, with the upper sprue gripper mechanism shown in its normally retracted position and the lower sprue gripper mechanism shown in its extended operative position, FIG. 6 is an end elevation view, partly broken away to show one of the sprue gripper mechanisms in its extended operative position and showing the disposition of the pneumatic cylinders controlling the upper mold section and the disposition of the lower mold section, the carriage and supporting frames, FIG. 7 is a view partly in side elevation and partly in section showing details of a sprue gripping mechanism shown in its open condition, and FIG. 8 is a top plan view of the sprue gripping mechanism shown in its extended operative position.

DETAILED DESCRIPTION OF THE INVENTION

Referring to the drawings, it will be seen that the apparatus includes a carriage 2 mounted for longitudinal movement along tracks generally designated 4, with movement of the carriage being effected by means of a pneumatic cylinder 6 mounted on a machine bed 7 and having the free end of its piston rod 8 connected to the carriage. Actuation of the cylinder 6 serves to reciprocate the carriage along the tracks 4. The carriage mounts the lower section of each of a pair of molds. Each of the molds comprises upper and lower mold sections 12 and 14 respectively, the lower mold section 14 being mounted on the carriage 2 and movable relative to the upper mold section 12. With the carriage positioned with the upper and lower sections of each mold in alignment with one another, a tight sealing engagement is obtained and each pair of mold sections defines therebetween a molding cavity 16. Each of the lower mold sections 14 is clamped to the carriage 2 by suitable retaining screws 18 and a cooling plate 20, provided with transversely extending passages 22 through which a cooling fluid may be circulated, is interposed between each of the lower mold sections and the carriage. The upper mold sections 12 are each clamped by means of screws 24 to vertically reciprocal pistons 26 of pneumatic cylinders 28 which are mounted in any suitable manner above the tracks 4 on a frame generally designated 29. A cooling plate 30 is interposed between each of the upper mold sections 12 and its associated piston 26. The cooling plates 30 are provided with transversely extending passages 31 through which a cooling fluid may be circulated.

Each of the lower mold sections 14 is provided with passages designated 32 having branch passages 34, 36 and 38 opening into the upper face of the lower mold section. Pins 35, 37 and 39 are positioned in the branch passages 34, 36 and 38 respectively. The upper ends of the pins 35, 37 and 39 normally lie flush with the upper surface of the lower mold section and are adapted to be ejected through the branch passages 34, 36 and 38 under the action of compressed air introduced into the passage 32. Each of the upper mold sections 12 is provided with a longitudinally extending passage 40 communicating with a number of vertically extending passages 42 which open onto the lower face of the upper mold section 12. Compressed air introduced into the passage 40 is adapted to flow through the passages 42 into the tops of the mold cavities and serves to blow molded soles out of the top mold sections.

Each of the molds is provided with an extruder 43 for plastic material having a barrel cap 44 which communicates through a nozzle 45 with the inlet end of a longitudinally extending passage 46 in the lower mold section 14 with the outlet end of the passage opening into the mold cavity defined between the upper and lower mold sections 12 and 14 respectively.

A normally open injection cut-off microswitch 48 is mounted on a side member 31 of the frame 29 and an injection terminating setting screw 49 is mounted on the upper face of the piston 26 in a position in which it engages and actuates the microswitch 48 when the pistons 26 are extended and the top mold sections 12 are moved into sealing engagement with the lower mold sections 14. A wiper plate 94 with an associated stop member 52 is mounted over the tracks 4 adjacent the front of the apparatus in the direction of forward travel of the carriage 2.

With the carriage 2 positioned beneath the cylinders 28, sprue gripping mechanisms 60 are moved about their pivots 76 to a position in which they extend parallel to and out of the path of travel of the carriage 2. Each of the sprue gripping mechanisms 60 comprises a pair of pivotally connected gripper members 62 and 64 having oppositely disposed jaws at one of their ends and a spring 66 connected at its opposite ends to the gripper members 62 and 64 respectively, with the spring resiliently biasing the two gripper members 62 and 64 away from each other. A roller 68 is rotatably mounted on the end of the lower gripper member 62 remote from its jaw and plate 70 mounted on the pivot